(12) United States Patent
Nelken

(10) Patent No.: US 9,584,665 B2
(45) Date of Patent: *Feb. 28, 2017

(54) SYSTEM AND METHOD FOR OPTIMIZING TIMING OF RESPONSES TO CUSTOMER COMMUNICATIONS

(75) Inventor: Yoram Nelken, Jerusalem (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1525 days.

This patent is subject to a terminal disclaimer.

(21) Appl. No.: 11/740,156

(22) Filed: Apr. 25, 2007

(65) Prior Publication Data
US 2007/0198871 A1    Aug. 23, 2007

Related U.S. Application Data

(63) Continuation of application No. 09/624,361, filed on Jul. 24, 2000, now Pat. No. 7,222,189, which is a (Continued)

(51) Int. Cl.
*G06F 15/173* (2006.01)
*H04M 3/523* (2006.01)
(Continued)

(52) U.S. Cl.
CPC ........ *H04M 3/5238* (2013.01); *G06F 9/4881* (2013.01); *G06Q 10/063114* (2013.01); *G06Q 10/10* (2013.01)

(58) Field of Classification Search
CPC ......... G06F 9/4881; G06Q 10/063112; H04M 3/5238
(Continued)

(56) References Cited

U.S. PATENT DOCUMENTS

| 3,648,253 A | 3/1972 | Mullery et al. |
| 4,110,823 A | 8/1978 | Cronshaw et al. |

(Continued)

FOREIGN PATENT DOCUMENTS

| CA | 2180392 | 2/2001 |
| EP | 0 597 630 | 5/1994 |

(Continued)

OTHER PUBLICATIONS

Firepond eService Provider, http://www.firepond.com/products/eserviceperformer.

(Continued)

*Primary Examiner* — Tonia L Dollinger
*Assistant Examiner* — Adam Cooney
(74) *Attorney, Agent, or Firm* — Gates & Cooper LLP

(57) ABSTRACT

A system and method for optimizing timing of responses to customer communications comprises a contact center and an operations center. The operations center includes a decision module that receives each communication and determines whether a partial response, such as an acknowledgement that the communication was received, is required. If a partial response is required, a response module sends a partial response to the sender that indicates the communication was received and preferably includes an estimate of the time required for a full response to the communication. All received communications are forwarded to a queue to await processing by an agent. The decision module determines whether a partial response is required based on an estimate of the amount of time required for a full response. If the time estimate is less than a predetermined threshold, a partial response is not sent and the communication is forwarded to a queue for processing.

14 Claims, 4 Drawing Sheets

Related U.S. Application Data continuation-in-part of application No. 09/602,588, filed on Jun. 21, 2000, now Pat. No. 6,408,277.

(51) Int. Cl.
  *G06F 9/48* (2006.01)
  *G06Q 10/06* (2012.01)
  *G06Q 10/10* (2012.01)

(58) Field of Classification Search
  USPC ..................................... 709/238, 240, 241
  See application file for complete search history.

(56) References Cited

U.S. PATENT DOCUMENTS

| | | |
|---|---|---|
| 4,286,322 A | 8/1981 | Hoffman et al. |
| 4,586,160 A | 4/1986 | Amano et al. |
| 4,642,756 A | 2/1987 | Sherrod |
| 4,658,370 A | 4/1987 | Erman et al. |
| 4,724,523 A | 2/1988 | Kucera |
| 4,805,107 A | 2/1989 | Kieckhafer et al. |
| 4,814,974 A | 3/1989 | Narayanan et al. |
| 4,817,027 A | 3/1989 | Plum et al. |
| 4,908,865 A | 3/1990 | Doddington et al. |
| 4,918,735 A | 4/1990 | Morito et al. |
| 4,942,527 A | 7/1990 | Schumacher |
| 4,984,178 A | 1/1991 | Hemphill et al. |
| 5,018,215 A | 5/1991 | Nasr et al. |
| 5,023,832 A | 6/1991 | Fulcher et al. |
| 5,040,141 A | 8/1991 | Yazima et al. |
| 5,051,924 A | 9/1991 | Bergeron et al. |
| 5,060,155 A | 10/1991 | Van Zuijlen |
| 5,067,099 A | 11/1991 | McCown et al. |
| 5,068,789 A | 11/1991 | Van Vliembergen |
| 5,099,425 A | 3/1992 | Yuii et al. |
| 5,101,349 A | 3/1992 | Tokunime et al. |
| 5,111,398 A | 5/1992 | Nunberg et al. |
| 5,125,024 A | 6/1992 | Gokcen et al. |
| 5,210,872 A | 5/1993 | Ferguson et al. |
| 5,228,116 A | 7/1993 | Harris et al. |
| 5,230,054 A | 7/1993 | Tamura |
| 5,247,677 A | 9/1993 | Welland et al. |
| 5,251,129 A | 10/1993 | Jacobs |
| 5,251,131 A | 10/1993 | Masand et al. |
| 5,265,033 A | 11/1993 | Vajk et al. |
| 5,278,942 A | 1/1994 | Bahl et al. |
| 5,287,430 A | 2/1994 | Iwamoto |
| 5,311,583 A * | 5/1994 | Friedes et al. ........... 379/210.01 |
| 5,321,608 A | 6/1994 | Namba et al. |
| 5,325,298 A | 6/1994 | Gallant |
| 5,325,526 A | 6/1994 | Cameron et al. |
| 5,345,501 A | 9/1994 | Shelton |
| 5,349,526 A | 9/1994 | Potts et al. |
| 5,365,430 A | 11/1994 | Jagadish |
| 5,369,570 A | 11/1994 | Parad |
| 5,369,577 A | 11/1994 | Kadashevich et al. |
| 5,371,807 A | 12/1994 | Register et al. |
| 5,377,354 A | 12/1994 | Scannell et al. |
| 5,418,717 A | 5/1995 | Su et al. |
| 5,418,948 A | 5/1995 | Turtle |
| 5,437,032 A | 7/1995 | Wolf et al. |
| 5,444,820 A | 8/1995 | Tzes et al. |
| 5,475,588 A | 12/1995 | Schabes et al. |
| 5,483,466 A | 1/1996 | Kawahara et al. |
| 5,487,100 A | 1/1996 | Kane |
| 5,493,677 A | 2/1996 | Balogh et al. |
| 5,493,692 A | 2/1996 | Theimer et al. |
| 5,506,787 A | 4/1996 | Muhlfeld et al. |
| 5,522,026 A | 5/1996 | Records et al. |
| 5,526,521 A | 6/1996 | Fitch et al. |
| 5,528,701 A | 6/1996 | Aref |
| 5,542,088 A | 7/1996 | Jennings, Jr. et al. |
| 5,555,344 A | 9/1996 | Zunkler |
| 5,559,710 A | 9/1996 | Shahraray et al. |
| 5,566,171 A | 10/1996 | Levinson |
| 5,574,933 A | 11/1996 | Horst |
| 5,577,241 A | 11/1996 | Spencer |
| 5,590,055 A | 12/1996 | Chapman et al. |
| 5,594,641 A | 1/1997 | Kaplan et al. |
| 5,596,502 A | 1/1997 | Koski et al. |
| 5,610,812 A | 3/1997 | Scabes et al. |
| 5,615,360 A | 3/1997 | Bezek et al. |
| 5,627,914 A | 5/1997 | Pagallo |
| 5,630,128 A | 5/1997 | Farrell et al. |
| 5,634,053 A | 5/1997 | Noble et al. |
| 5,634,121 A | 5/1997 | Tracz et al. |
| 5,636,124 A | 6/1997 | Rischar et al. |
| 5,649,215 A | 7/1997 | Itoh |
| 5,664,061 A | 9/1997 | Andreshak et al. |
| 5,680,628 A | 10/1997 | Carus et al. |
| 5,687,384 A | 11/1997 | Nagase |
| 5,694,616 A | 12/1997 | Johnson et al. |
| 5,701,400 A | 12/1997 | Amado |
| 5,708,829 A | 1/1998 | Kadashevich |
| 5,715,371 A | 2/1998 | Ahamed et al. |
| 5,721,770 A | 2/1998 | Kohler |
| 5,721,897 A | 2/1998 | Rubinstein |
| 5,724,481 A | 3/1998 | Garberg et al. |
| 5,737,621 A | 4/1998 | Kaplan et al. |
| 5,737,734 A | 4/1998 | Schultz |
| 5,745,652 A | 4/1998 | Bigus |
| 5,745,736 A | 4/1998 | Picart |
| 5,748,973 A | 5/1998 | Palmer et al. |
| 5,754,671 A | 5/1998 | Higgins et al. |
| 5,761,631 A | 6/1998 | Nasukawa |
| 5,765,033 A | 6/1998 | Miloslavsky |
| 5,768,578 A | 6/1998 | Kirk et al. |
| 5,794,194 A | 8/1998 | Takebayashi et al. |
| 5,799,268 A | 8/1998 | Boguraev |
| 5,802,253 A | 9/1998 | Gross et al. |
| 5,806,040 A | 9/1998 | Vensko |
| 5,809,462 A | 9/1998 | Nussbaum |
| 5,809,464 A | 9/1998 | Kopp et al. |
| 5,811,706 A | 9/1998 | Van Buskirk et al. |
| 5,822,731 A | 10/1998 | Schultz |
| 5,822,745 A | 10/1998 | Hekmatpour |
| 5,826,076 A | 10/1998 | Bradley et al. |
| 5,832,220 A | 11/1998 | Johnson et al. |
| 5,832,470 A | 11/1998 | Morita et al. |
| 5,835,682 A | 11/1998 | Broomhead et al. |
| 5,845,246 A | 12/1998 | Schalk |
| 5,850,219 A | 12/1998 | Kumomura |
| 5,860,059 A | 1/1999 | Aust et al. |
| 5,864,848 A | 1/1999 | Horvitz et al. |
| 5,864,863 A | 1/1999 | Burrows |
| 5,867,160 A | 2/1999 | Kraft et al. |
| 5,867,495 A | 2/1999 | Elliott et al. |
| 5,878,385 A | 3/1999 | Bralich et al. |
| 5,878,386 A | 3/1999 | Coughlin |
| 5,884,032 A * | 3/1999 | Bateman et al. ............. 709/204 |
| 5,884,302 A | 3/1999 | Ho |
| 5,890,142 A | 3/1999 | Tanimura et al. |
| 5,890,147 A | 3/1999 | Peltonen et al. |
| 5,895,447 A | 4/1999 | Ittycheriah et al. |
| 5,899,971 A | 5/1999 | De Vos |
| 5,913,215 A | 6/1999 | Rubinstein et al. |
| 5,920,835 A | 7/1999 | Huzenlaub et al. |
| 5,933,822 A | 8/1999 | Braden-Harder et al. |
| 5,937,400 A | 8/1999 | Au |
| 5,940,612 A | 8/1999 | Brady et al. |
| 5,940,821 A | 8/1999 | Wical |
| 5,944,778 A | 8/1999 | Takeuchi et al. |
| 5,946,388 A | 8/1999 | Walker et al. |
| 5,948,058 A | 9/1999 | Kudoh et al. |
| 5,950,184 A | 9/1999 | Kartutunen |
| 5,950,192 A | 9/1999 | Moore et al. |
| 5,956,711 A | 9/1999 | Sullivan et al. |
| 5,960,393 A | 9/1999 | Cohrs et al. |
| 5,963,447 A | 10/1999 | Kohn et al. |
| 5,963,894 A | 10/1999 | Richardson et al. |
| 5,970,449 A | 10/1999 | Alleva et al. |
| 5,974,385 A | 10/1999 | Ponting et al. |
| 5,974,465 A | 10/1999 | Wong |
| 5,983,216 A | 11/1999 | Kirach |

(56) References Cited

U.S. PATENT DOCUMENTS

| | | |
|---|---|---|
| 5,991,713 A | 11/1999 | Unger et al. |
| 5,991,751 A | 11/1999 | Rivette et al. |
| 5,991,756 A | 11/1999 | Wu |
| 5,995,513 A | 11/1999 | Harrand et al. |
| 5,999,932 A | 12/1999 | Paul |
| 5,999,990 A | 12/1999 | Sharrit et al. |
| 6,002,760 A | 12/1999 | Gisby |
| 6,006,221 A | 12/1999 | Liddy et al. |
| 6,009,422 A | 12/1999 | Ciccarelli |
| 6,012,053 A | 1/2000 | Pant et al. |
| 6,018,735 A | 1/2000 | Hunter |
| 6,021,403 A | 2/2000 | Horvitz et al. |
| 6,025,843 A | 2/2000 | Sklar |
| 6,026,388 A | 2/2000 | Liddy et al. |
| 6,032,111 A | 2/2000 | Mohri et al. |
| 6,035,104 A | 3/2000 | Zahariev |
| 6,038,535 A | 3/2000 | Campbell |
| 6,038,560 A | 3/2000 | Wical |
| 6,044,146 A | 3/2000 | Gisby et al. |
| 6,055,528 A | 4/2000 | Evans |
| 6,058,365 A | 5/2000 | Nagal et al. |
| 6,058,389 A | 5/2000 | Chandra et al. |
| 6,061,667 A | 5/2000 | Danford-Klein et al. |
| 6,061,709 A | 5/2000 | Bronte |
| 6,064,953 A | 5/2000 | Maxwell, III et al. |
| 6,064,971 A | 5/2000 | Hartnett |
| 6,064,977 A | 5/2000 | Haverstock et al. |
| 6,067,565 A | 5/2000 | Horvitz |
| 6,070,149 A | 5/2000 | Tavor et al. |
| 6,070,158 A | 5/2000 | Kirsch et al. |
| 6,073,098 A | 6/2000 | Buchsbaum et al. |
| 6,073,101 A | 6/2000 | Maes |
| 6,073,142 A | 6/2000 | Geiger et al. |
| 6,076,088 A | 6/2000 | Paik et al. |
| 6,081,774 A | 6/2000 | de Hita et al. |
| 6,085,159 A | 7/2000 | Ortega et al. |
| 6,091,414 A | 7/2000 | Kraft et al. |
| 6,092,042 A | 7/2000 | Iso |
| 6,092,095 A | 7/2000 | Maytal |
| 6,092,103 A | 7/2000 | Pritsch |
| 6,094,652 A | 7/2000 | Faisal |
| 6,098,047 A | 8/2000 | Oku et al. |
| 6,101,537 A | 8/2000 | Edelstein et al. |
| 6,112,126 A | 8/2000 | Hales et al. |
| 6,115,734 A | 9/2000 | Mansion |
| 6,138,128 A | 10/2000 | Perkowitz et al. |
| 6,138,139 A | 10/2000 | Beck et al. |
| 6,144,940 A | 11/2000 | Nishi et al. |
| 6,148,322 A | 11/2000 | Sand et al. |
| 6,151,538 A | 11/2000 | Bate et al. |
| 6,154,720 A | 11/2000 | Onishi et al. |
| 6,161,094 A | 12/2000 | Adcock et al. |
| 6,161,130 A | 12/2000 | Horvitz et al. |
| 6,163,767 A | 12/2000 | Tang et al. |
| 6,167,370 A | 12/2000 | Tsourikov et al. |
| 6,169,986 B1 | 1/2001 | Bowman et al. |
| 6,182,029 B1 | 1/2001 | Friedman |
| 6,182,036 B1 | 1/2001 | Poppert |
| 6,182,059 B1 | 1/2001 | Angotti et al. |
| 6,182,063 B1 | 1/2001 | Woods |
| 6,182,065 B1 | 1/2001 | Yeomans |
| 6,182,120 B1 | 1/2001 | Beaulieu et al. |
| 6,185,603 B1 | 2/2001 | Henderson et al. |
| 6,199,103 B1 | 3/2001 | Sakaguchi et al. |
| 6,203,495 B1 | 3/2001 | Bardy |
| 6,212,544 B1 | 4/2001 | Borkenhagen et al. |
| 6,223,201 B1 | 4/2001 | Reznak |
| 6,226,630 B1 | 5/2001 | Billmers |
| 6,233,575 B1 | 5/2001 | Agrawal et al. |
| 6,233,578 B1 | 5/2001 | Machihara et al. |
| 6,236,987 B1 | 5/2001 | Horowitz et al. |
| 6,243,679 B1 | 6/2001 | Mohri et al. |
| 6,243,735 B1 | 6/2001 | Imanishi et al. |
| 6,249,606 B1 | 6/2001 | Kiraly et al. |
| 6,253,188 B1 | 6/2001 | Witek et al. |
| 6,256,773 B1 | 7/2001 | Bowman-Amuah |
| 6,260,058 B1 | 7/2001 | Hoenninger et al. |
| 6,263,066 B1 | 7/2001 | Shtivelman et al. |
| 6,263,335 B1 | 7/2001 | Paik et al. |
| 6,269,368 B1 | 7/2001 | Diamond |
| 6,271,840 B1 | 8/2001 | Finseth et al. |
| 6,275,819 B1 | 8/2001 | Carter |
| 6,278,973 B1 | 8/2001 | Chung et al. |
| 6,282,565 B1 | 8/2001 | Shaw et al. |
| 6,292,794 B1 | 9/2001 | Cecchini et al. |
| 6,292,938 B1 | 9/2001 | Sarkar et al. |
| 6,298,324 B1 | 10/2001 | Zuberec et al. |
| 6,301,602 B1 | 10/2001 | Ucki |
| 6,304,864 B1 | 10/2001 | Liddy et al. |
| 6,304,872 B1 | 10/2001 | Chao |
| 6,308,197 B1 | 10/2001 | Mason et al. |
| 6,311,194 B1 | 10/2001 | Sheth et al. |
| 6,314,439 B1 | 11/2001 | Bates et al. |
| 6,314,446 B1 | 11/2001 | Stiles |
| 6,324,534 B1 | 11/2001 | Neal et al. |
| 6,327,581 B1 | 12/2001 | Platt |
| 6,349,295 B1 | 2/2002 | Tedesco et al. |
| 6,353,667 B1 | 3/2002 | Foster et al. |
| 6,353,827 B1 | 3/2002 | Davies et al. |
| 6,356,633 B1* | 3/2002 | Armstrong .............. 379/265.11 |
| 6,360,243 B1 | 3/2002 | Lindsley et al. |
| 6,363,373 B1 | 3/2002 | Steinkraus |
| 6,363,377 B1 | 3/2002 | Kravets et al. |
| 6,366,910 B1 | 4/2002 | Rajaraman et al. |
| 6,370,526 B1 | 4/2002 | Agrawal et al. |
| 6,374,221 B1 | 4/2002 | Haimi-Cohen |
| 6,377,945 B1 | 4/2002 | Rievik |
| 6,377,949 B1 | 4/2002 | Gilmour |
| 6,389,405 B1 | 5/2002 | Oatman et al. |
| 6,393,415 B1 | 5/2002 | Getchius et al. |
| 6,393,465 B2 | 5/2002 | Leeds |
| 6,397,209 B1 | 5/2002 | Read et al. |
| 6,397,212 B1 | 5/2002 | Biffar |
| 6,401,084 B1 | 6/2002 | Ortega et al. |
| 6,408,277 B1 | 6/2002 | Nelken |
| 6,411,947 B1 | 6/2002 | Rice et al. |
| 6,411,982 B2 | 6/2002 | Williams |
| 6,415,250 B1 | 7/2002 | van den Akker |
| 6,418,458 B1 | 7/2002 | Maresco |
| 6,421,066 B1 | 7/2002 | Silvan |
| 6,421,675 B1 | 7/2002 | Ryan et al. |
| 6,424,995 B1 | 7/2002 | Shuman |
| 6,424,997 B1 | 7/2002 | Buskirk, Jr. et al. |
| 6,430,615 B1 | 8/2002 | Hellerstein et al. |
| 6,434,435 B1 | 8/2002 | Tubel et al. |
| 6,434,554 B1 | 8/2002 | Asami et al. |
| 6,434,556 B1 | 8/2002 | Levin et al. |
| 6,438,540 B2 | 8/2002 | Nasr et al. |
| 6,438,575 B1 | 8/2002 | Khan et al. |
| 6,442,542 B1 | 8/2002 | Ramani et al. |
| 6,442,589 B1 | 8/2002 | Takahashi et al. |
| 6,446,061 B1 | 9/2002 | Doerre et al. |
| 6,446,081 B1 | 9/2002 | Preston |
| 6,446,256 B1 | 9/2002 | Hyman et al. |
| 6,449,589 B1 | 9/2002 | Moore |
| 6,449,646 B1 | 9/2002 | Sikora et al. |
| 6,460,074 B1 | 10/2002 | Fishkin |
| 6,463,533 B1 | 10/2002 | Calamera et al. |
| 6,466,940 B1 | 10/2002 | Mills |
| 6,477,500 B2 | 11/2002 | Maes |
| 6,477,580 B1 | 11/2002 | Bowman-Amuah |
| 6,480,843 B2 | 11/2002 | Li |
| 6,490,572 B2 | 12/2002 | Akkiraju et al. |
| 6,493,447 B1* | 12/2002 | Goss et al. .............. 379/265.09 |
| 6,493,694 B1 | 12/2002 | Xu et al. |
| 6,496,836 B1 | 12/2002 | Ronchi |
| 6,496,853 B1 | 12/2002 | Klien |
| 6,499,021 B1 | 12/2002 | Abu-Hakima |
| 6,505,158 B1 | 1/2003 | Conkie |
| 6,507,872 B1 | 1/2003 | Geshwind |
| 6,513,026 B1 | 1/2003 | Horvitz et al. |
| 6,535,795 B1 | 3/2003 | Schroeder et al. |
| 6,542,889 B1 | 4/2003 | Aggarwal et al. |
| 6,553,358 B1 | 4/2003 | Horvitz |

(56) References Cited

U.S. PATENT DOCUMENTS

| | | | |
|---|---|---|---|
| 6,560,330 B2 | 5/2003 | Gabriel | |
| 6,560,590 B1 | 5/2003 | Shwe et al. | |
| 6,571,282 B1 | 5/2003 | Bowman-Amuah | |
| 6,574,480 B1 | 6/2003 | Foladare et al. | |
| 6,574,658 B1 | 6/2003 | Gabber et al. | |
| 6,578,025 B1 | 6/2003 | Pollack et al. | |
| 6,584,464 B1 | 6/2003 | Warthen | |
| 6,594,697 B1 | 7/2003 | Praitis et al. | |
| 6,601,026 B2 | 7/2003 | Appelt et al. | |
| 6,607,136 B1 | 8/2003 | Atsmon et al. | |
| 6,611,535 B2 | 8/2003 | Ljungqvist | |
| 6,611,825 B1 | 8/2003 | Billheimer et al. | |
| 6,615,172 B1 | 9/2003 | Bennett et al. | |
| 6,618,727 B1 | 9/2003 | Wheeler et al. | |
| 6,628,194 B1 | 9/2003 | Hellebust et al. | |
| 6,636,733 B1 | 10/2003 | Helferich | |
| 6,651,220 B1 | 11/2003 | Penteroudakis et al. | |
| 6,654,726 B1 | 11/2003 | Hanzek | |
| 6,654,815 B1 | 11/2003 | Goss et al. | |
| 6,665,662 B1 | 12/2003 | Kirkwood et al. | |
| 6,675,159 B1 | 1/2004 | Lin et al. | |
| 6,704,728 B1 | 3/2004 | Chang et al. | |
| 6,708,205 B2 | 3/2004 | Sheldon et al. | |
| 6,711,561 B1 | 3/2004 | Chang et al. | |
| 6,714,643 B1* | 3/2004 | Gargeya et al. | 379/266.06 |
| 6,714,905 B1 | 3/2004 | Chang et al. | |
| 6,718,367 B1 | 4/2004 | Ayyadurai | |
| 6,724,887 B1* | 4/2004 | Eilbacher et al. | 379/265.03 |
| 6,732,149 B1 | 5/2004 | Kephart | |
| 6,738,759 B1 | 5/2004 | Wheeler et al. | |
| 6,741,698 B1* | 5/2004 | Jensen | 379/265.02 |
| 6,742,015 B1 | 5/2004 | Bowman-Amuah | |
| 6,744,878 B1 | 6/2004 | Komissarchik et al. | |
| 6,745,181 B1 | 6/2004 | Chang et al. | |
| 6,747,970 B1 | 6/2004 | Lamb et al. | |
| 6,748,387 B2 | 6/2004 | Garber et al. | |
| 6,754,335 B1 | 6/2004 | Shaffer et al. | |
| 6,766,320 B1 | 7/2004 | Wang et al. | |
| 6,771,765 B1 | 8/2004 | Crowther et al. | |
| 6,785,671 B1 | 8/2004 | Bailey et al. | |
| 6,829,764 B1 | 12/2004 | Cohen et al. | |
| 6,832,244 B1 | 12/2004 | Raghunandan | |
| 6,832,245 B1 | 12/2004 | Isaacs et al. | |
| 6,850,513 B1 | 2/2005 | Pelissier | |
| 6,862,710 B1 | 3/2005 | Machisio | |
| 6,868,065 B1 | 3/2005 | Kloth et al. | |
| 6,879,586 B2 | 4/2005 | Miloslavsky et al. | |
| 6,959,078 B1 | 10/2005 | Eilbacher et al. | |
| 7,007,067 B1 | 2/2006 | Azvine et al. | |
| 7,047,242 B1 | 5/2006 | Ponte | |
| 7,051,277 B2 | 5/2006 | Kephart et al. | |
| 7,076,527 B2 | 7/2006 | Bellegarda et al. | |
| 7,131,057 B1 | 10/2006 | Ferrucci et al. | |
| 7,194,681 B1 | 3/2007 | Horvitz | |
| 7,200,606 B2 | 4/2007 | Elkan | |
| 7,219,054 B1 | 5/2007 | Begeja et al. | |
| 7,272,853 B2 | 9/2007 | Goodman et al. | |
| 7,363,590 B2 | 4/2008 | Kerr et al. | |
| 7,366,760 B2 | 4/2008 | Warren et al. | |
| 7,370,020 B1 | 5/2008 | Azvine et al. | |
| 7,376,701 B2 | 5/2008 | Bhargava et al. | |
| 7,409,336 B2 | 8/2008 | Pak et al. | |
| 7,519,668 B2 | 4/2009 | Goodman et al. | |
| 7,565,403 B2 | 7/2009 | Horvitz et al. | |
| 2001/0027463 A1 | 10/2001 | Kobayashi | |
| 2001/0042090 A1 | 11/2001 | Williams | |
| 2001/0047270 A1 | 11/2001 | Gusick et al. | |
| 2001/0056456 A1 | 12/2001 | Cota-Robles | |
| 2002/0029825 A1 | 3/2002 | Kuehmann et al. | |
| 2002/0032715 A1 | 3/2002 | Utsumi | |
| 2002/0049602 A1 | 4/2002 | Horvitz | |
| 2002/0052907 A1 | 5/2002 | Wakai et al. | |
| 2002/0059161 A1 | 5/2002 | Li | |
| 2002/0065953 A1 | 5/2002 | Alford et al. | |
| 2002/0073129 A1 | 6/2002 | Wang et al. | |
| 2002/0078119 A1 | 6/2002 | Brenner et al. | |
| 2002/0078121 A1 | 6/2002 | Ballantyne | |
| 2002/0078257 A1 | 6/2002 | Nishimura | |
| 2002/0083251 A1 | 6/2002 | Chauvel et al. | |
| 2002/0087618 A1 | 7/2002 | Bohm et al. | |
| 2002/0087623 A1 | 7/2002 | Eatough | |
| 2002/0091746 A1 | 7/2002 | Umberger et al. | |
| 2002/0099714 A1 | 7/2002 | Murray | |
| 2002/0103871 A1 | 8/2002 | Pustejovsky | |
| 2002/0107926 A1 | 8/2002 | Lee | |
| 2002/0116463 A1 | 8/2002 | Hart | |
| 2002/0150966 A1 | 10/2002 | Muraca | |
| 2002/0154645 A1 | 10/2002 | Hu et al. | |
| 2002/0196911 A1 | 12/2002 | Gao et al. | |
| 2003/0028564 A1 | 2/2003 | Sanfilippo | |
| 2003/0046297 A1 | 3/2003 | Mason | |
| 2003/0074397 A1 | 4/2003 | Morin | |
| 2003/0233419 A1 | 12/2003 | Beringer | |
| 2003/0236845 A1 | 12/2003 | Pitsos | |
| 2004/0167889 A1 | 8/2004 | Chang et al. | |
| 2004/0177120 A1 | 9/2004 | Kirsch | |
| 2004/0205135 A1 | 10/2004 | Hallam-Baker | |
| 2004/0225653 A1 | 11/2004 | Nelken et al. | |
| 2004/0254904 A1 | 12/2004 | Nelken et al. | |
| 2005/0187913 A1 | 8/2005 | Nelken et al. | |

FOREIGN PATENT DOCUMENTS

| | | |
|---|---|---|
| EP | 0 304 191 | 2/1999 |
| JP | 09106296 | 4/1997 |
| WO | 00/36487 | 6/2000 |
| WO | 01/84373 | 8/2001 |
| WO | 01/84374 | 8/2001 |

OTHER PUBLICATIONS

Definition—Definition of Contact Center, http://www.searchcrm.techtarget.com/s.

"Natural Language Engines or Advanced Customer Interaction," Banter White Paper by Banter Inc.

"The Foundation for Quality E-Communications," Technical White Paper.

"Transforming Your Call Center Into a Contact Center: Where Are You? Trends and Recommendations," An IDC Executive Brief (#33), Jun. 2001.

Hawkins et al., "The Evolution of the Call Center to the 'Customer Contact Center'", ITSC White Paper, Feb. 2001.

Breese et al., "Empirical Analysis of Predictive Algorithms for Collaborative Filtering," Proc. of the $14^{th}$ Conf. on Uncertainty in Artificial Intelligence, Jul. 1998.

Czerwinski et al., "Visualizing Implicit Queries for Information Management and Retrieval," Proc. of CHI 1999; ACM SIGCHI Conf. on Human Factors in Computing Systems, 1999.

Dumais et al., "Inductive Learning Algorithms and Representations for Task Categorization," Proc. of $7^{th}$ Intl. Conf. on Information & Knowledge Management, 1998.

Horvitz, "Principles of Mixed-Initiative User Interfaces," Proc. of CHI 1999; ACM SIGCHI Conf. on Human Factors in Computing Systems, 1999.

Horvitz et al., "Display of Information for Time-Critical Decision Making," Proc. of the $11^{th}$ Conf. on Uncertainty in Artificial Intelligence, Jul. 1995.

Horvitz et al., "The Lumiere Project: Bayesian User Modeling . . . ," Proc. of the $14^{th}$ Conf. on Uncertainty in Artificial Intelligence, Jul. 1998.

Horvitz et al., "Time-Dependent Utility and Action Under Uncertainty," Proc. of the $7^{th}$ Conf. on Uncertainty in Artificial Intelligence, Jul. 1991.

Horvitz et al., "Time-Critical Action: Representations and Application," Proc. of the $13^{th}$ Conf. on Uncertainty in Artificial Intelligence, Jul. 1997.

Koller et al., "Toward Optimal Feature Selection," Proc. of the $13^{th}$ Conf. on Machine Learning, 1996.

(56) References Cited

OTHER PUBLICATIONS

Lieberman, "Letizia: An Agent That Assists in Web Browsing," Proc. of International Joint Conference on Artificial Intelligence, 1995.
Platt, "Fast Training of Support Vector Machines Using Sequential Minimal Optimization," Advances in Kernel Methods: Support Vector Learning, MIT Press, Cambridge MA 1999.
Platt, "Probabilistic Outputs for Support Vector Machines & Comparisons to Regularized Likelihood Methods," Adv. in Large Margin Classifiers, MIT Press, Cambridge MA 1999.
Sahami et al., "A Bayesian Approach to Filtering Junk E-Mail," Amer. Assoc. for Art. Intell. Technical Report WS-98-05, 1998.
Cohen, "Learning Rules that Classify E-Mail," AT&T Laboratories, 1996.
Lewis, "Evaluating and Optimizing Autonomous Text Classification Systems," ACM SIGIR, 1995.
Lewis et al., "Training Algorithms for Linear Text Classifiers," ACM SIGIR, 1996.
Apte et al., "Automated Learning of Decision Rules for Text Categorization," ACM Transactions on Information Systems, vol. 12, No. 3, 1994.
Losee, Jr., "Minimizing Information Overload: The Ranking of Electronic Messages," Journal of Information Science 15, 1989.
Joachimes, "Text Categorization with Support Vector Machines: Learning with Many Relevant Features," Universitat Dortmund, Germany, 1998.
Berners-Lee et al., "The Semantic Web," Scientific American.com, May 17, 2001.
Lohman, "Grammar-like Functional Rules for Representing Query Optimization Alternative," 1998 ACM, pp. 18-27.
Androutsopoulos, Ion et al. "An Experimental Comparison of Na'ive Bayesian and Keyword-Based Anti-Spam Filtering with Personal E-mail Messages." Proceedings of the 23rd annual international ACM SIGIR conference on Research and development in information retrieval. ACM Press. Jul. 2000. 160-167.
Brasethvik et al., "A Conceptual Modeling Approach to Semantic Document Retrieval," Proceedings of the 14th International Conference on Advanced Information Systems Engineering, May 27-31, 2002.
Browning, Brandon. "Getting Rid of Spam." Linux Journal. Mar. 1998. Specialized Systems Consultants Inc. 4 pages.
Chai et al. "Bayesian online classifiers for text classification and filtering." international ACM SIGIR conference on Research and development in information retrieval. Proceedings of the 25th annual ACM Press. Aug. 2002. 97-104.
Computer Dictionary, Microsoft Press, 1997, Third Edition, p. 192.
Cranor, Lorrie Faith et al. "Spam!". Communications of the ACM. Aug. 1998. ACM Press. 74-83.
Davies et al., "Knowledge Discovery and Delivery," British Telecommunications Engineering, London, GB, vol. 17, No. 1, Apr. 1, 1998, pp. 25-35.
Hall, "How to Avoid Unwanted Email" Communications of the ACM. Volume 41, No. 3. ACM Press. Mar. 1998. 88-95.
Han et al., "WebACE: A Web Agent for Document Categorization and Exploration," Proceedings of the 2nd International Conference on Autonomous Agents Minneapolis/St. Paul, MN, May 9-13, 1998, Proceedings of the International Conference on Autonomous Agents, New York, NY, May 9, 1998, pp. 408-415.
Johnson et al., "Adaptive Model-Based Neural Network Control," IEEE Int'l Conf. on Robotics and Automation, May 13-18, 1990.
Kalogeraski et al, "Using multiple feedback loops for object profiling, scheduling and migration in soft real-time distributed object systems," IEEE Int'l Symposium on Object-Oriented Real Time Distributed Computing Proceedings; May 2-5, 1999; pp. 291-300.
Khan et al., "Personal Adaptive Web Agent: A Tool for Information Filtering," Canadian Conference on Electrical and Computer Engineering, vol. 1, May 25, 1997, pp. 305-308.
Mase, "Experiments on Automatic Web Page Categorization for IR Systems," Technical Report, Stanford University, 1998.
McKinnon et al., "Data Communications and Management of a Distributed Network of Automated Data Acquisition Systems," 1997 IEEE Nuclear Science Symp., Nov. 1997.
Moore et al., "Web Page Categorization and Feature Selection Using Association Rule and Principal Component Clustering," Proceedings of the 7th Workshop on Information Technologies and Systems, Dec. 1997.
Morelli et al., "Predicting Technical Communication in Product Development Organizations," IEEE Transactions on Engineering Management, vol. 42, issue 3, Aug. 1995.
Parmentier et al., "Logical Structure Recognition of Scientific Bibliographic References," 4th Int'l. Conf. on Document Analysis and Recognition, vol. 2, Aug. 18-20, 1997.
Persin, "Document Filtering for Fast Ranking," Sigir 94. Dublin, Jul. 3-6, 1994, Proceedings of the Annual International ACM-Sigir Conference on Research and Development in Information Retrieval, Berlin, Springer, DE, vol. Conf. 17, Jul. 3, 1994, pp. 339-348.
Schneider, "A Comparison of Event Models for Naive Bayes Anti-Spam E-Mail Filtering." Proceedings of the tenth conference on European chapter of the Association for Computational Linguistics. Volume 1. 307 314. Apr. 2003.
Shimazu et al., "CAPIT: Natural Language Interface Design Tool with Keyword Analyzer and Case-Based Parser," NEC Research and Development, Nippon Electric Ltd., Tokyo, JP, vol. 33, No. 4, Oct. 1, 1992, pp. 679-688.
Webster's Computer Internet Dictionary, 3rd Edition, P.E. Margolis, 1999.
Webster's Third New International Dictionary, G.&C. Meriam Company, 1961, pp. 538, 834, 1460.

* cited by examiner

SYSTEM AND METHOD FOR OPTIMIZING TIMING OF RESPONSES TO CUSTOMER COMMUNICATIONS

CROSS-REFERENCE TO RELATED APPLICATIONS

This application is a continuation and claims the priority benefit of U.S. patent application Ser. No. 09/624,361, entitled "SYSTEM AND METHOD FOR OPTIMIZING TIMING OF RESPONSES TO CUSTOMER COMMUNICATIONS," filed Jul. 24, 2000, now U.S. Pat. No. 7,222,189, which is a continuation-in-part of U.S. patent application Ser. No. 09/602,588, entitled "SYSTEM AND METHOD FOR AUTOMATIC TASK PRIORITIZATION," filed Jun. 21, 2000, now U.S. Pat. No. 6,408,277, issued on Jun. 18, 2002.

BACKGROUND OF THE INVENTION

1. Field of the Invention

This invention relates generally to electronic communication systems and more particularly to a system and method for optimizing timing of responses to customer communications.

2. Description of the Background Art

Organizations may interact with customers and others via a wide variety of communication channels. Text-based communication channels typically do not involve one-to-one contact with a representative of the organization. Customers may send e-mail, submit a web-based form, or send a facsimile and have some uncertainty as to whether the communication was received.

Organizations often address this uncertainty by immediately sending an acknowledgement to every communication. In many situations, this immediate acknowledgement is highly appreciated by the sender. For example, an order placed with a retailer may not be filled for a week or more. An immediate acknowledgement provides the customer with assurance that their order was received and is being processed.

However, in other situations, an immediate acknowledgement or other partial response is an annoyance. If the communication includes a request that is fulfilled hours, or even minutes later, an immediate acknowledgement is typically of little or no value to the sender. For instance, a customer may request a transfer of funds from one bank account to another using a web-based form, then move on to other web-sites and later log-off without checking their e-mail. A transfer of funds may be accomplished in a short period of time, so the customer will likely have received both an acknowledgement of the request and a confirmation that the transfer was completed by the next time they open their e-mail. These multiple messages may be confusing or annoying to the customer. Thus, a system and method for optimizing timing of responses to customer communications is needed.

SUMMARY OF THE INVENTION

In accordance with the present invention, a system and method are disclosed to optimize timing of responses to customer communications. The invention includes a contact center for receiving communications via various types of communication channels, an operations center for processing the communications, and an agent pool. The operations center comprises a decision module, a response module, queues, and an agent interface. Communications enter the operations center at the decision module, which analyzes each communication and determines whether a partial response, such as an acknowledgement, should be sent. If a partial response should be sent, the decision module forwards the sender's contact information and type of communication to the response module, which responsively sends a partial response to the sender. In the preferred embodiment, the partial response includes an estimate of the time required for a full response to the communication.

If the decision module determines that a partial response is not required, the communication is sent to one of the queues to await processing by an agent. When a partial response is required the decision module also sends the communication to a queue for processing. Each queue preferably stores a certain type of communication. Agents from the agent pool select communications from the queues for processing via the agent interface.

The decision module determines whether a partial response is required based on an estimate of the time required for a full response to the communication. If the time estimate is less than a predetermined threshold, then a partial response is not required. Thus, if a full response may be sent in a reasonable amount of time, a customer or other sender is not sent unnecessary responses. Also, if a partial response is sent, the customer is informed of the time estimate for a full response.

If the full response is not sent before the time estimate expires, the response module may send an additional response to the customer indicating that processing of the full response is in progress. The additional response may also include an additional time estimate for the full response. In this manner, the present invention optimizes timing of responses to customer communications.

DETAILED DESCRIPTION OF THE PREFERRED EMBODIMENT

The present invention includes a system and method for optimizing timing of responses to customer communications.

Figure 1:
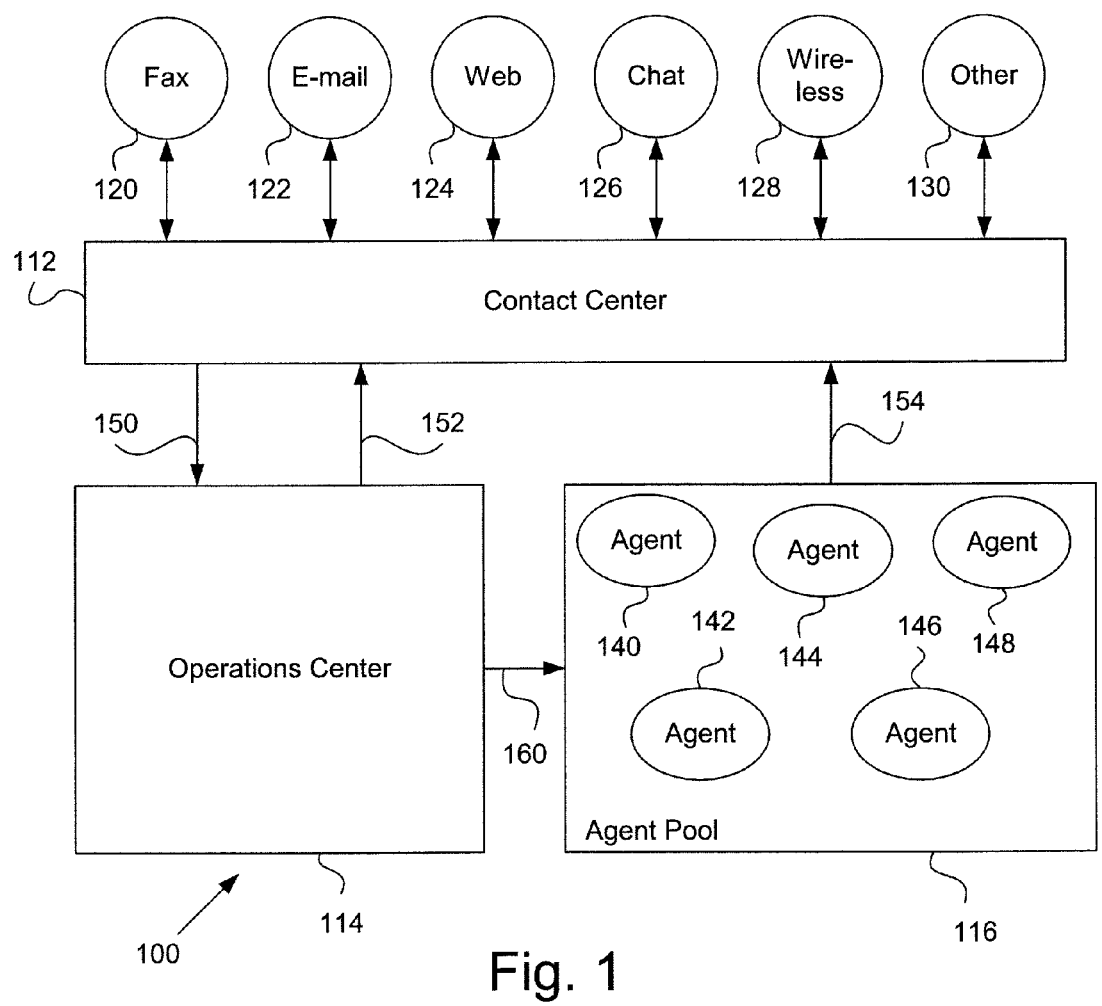
FIG. 1 is a block diagram of one embodiment for an electronic communications system, according to the present invention.

FIG. 1 is a block diagram of one embodiment of an electronic communication system 100 according to the invention. System 100 includes, but is not limited to, a contact center 112, an operations center 114, and an agent pool 116. Contact center 112 may receive and send communications using various communication channels. The channels include, but are not limited to, a facsimile (fax) 120 channel, an E-mail 122 channel, a web-based communication (web) 124 channel, a chat communication (chat) 126 channel, and a wireless 128 communication channel. Other 130 forms of text-based communication channels are within the scope of the present invention.

Contact center 112 forwards communications via path 150 to operations center 114. Agents 140-148 in agent pool 16 select communications to process from operations center 114 via path 160. Each agent 140 is preferably a skilled person trained to process the types of communications typically received by system 100. Although only five agents are shown in FIG. 1, agent pool 116 may utilize any number of agents.

Communications typically require some form of response, such as a confirmation that an order has been filled or a decision regarding a loan application. Agents 140-148 may compose responses to communications or responses may be generated automatically. Operations center 114 may send automatic responses via path 152 to contact center 112. Agents 140-148 may send composed responses via path 154 to contact center 112. Contact center 112 then forwards the responses to the senders via an appropriate communication channel, such as E-mail 122.

Figure 2:
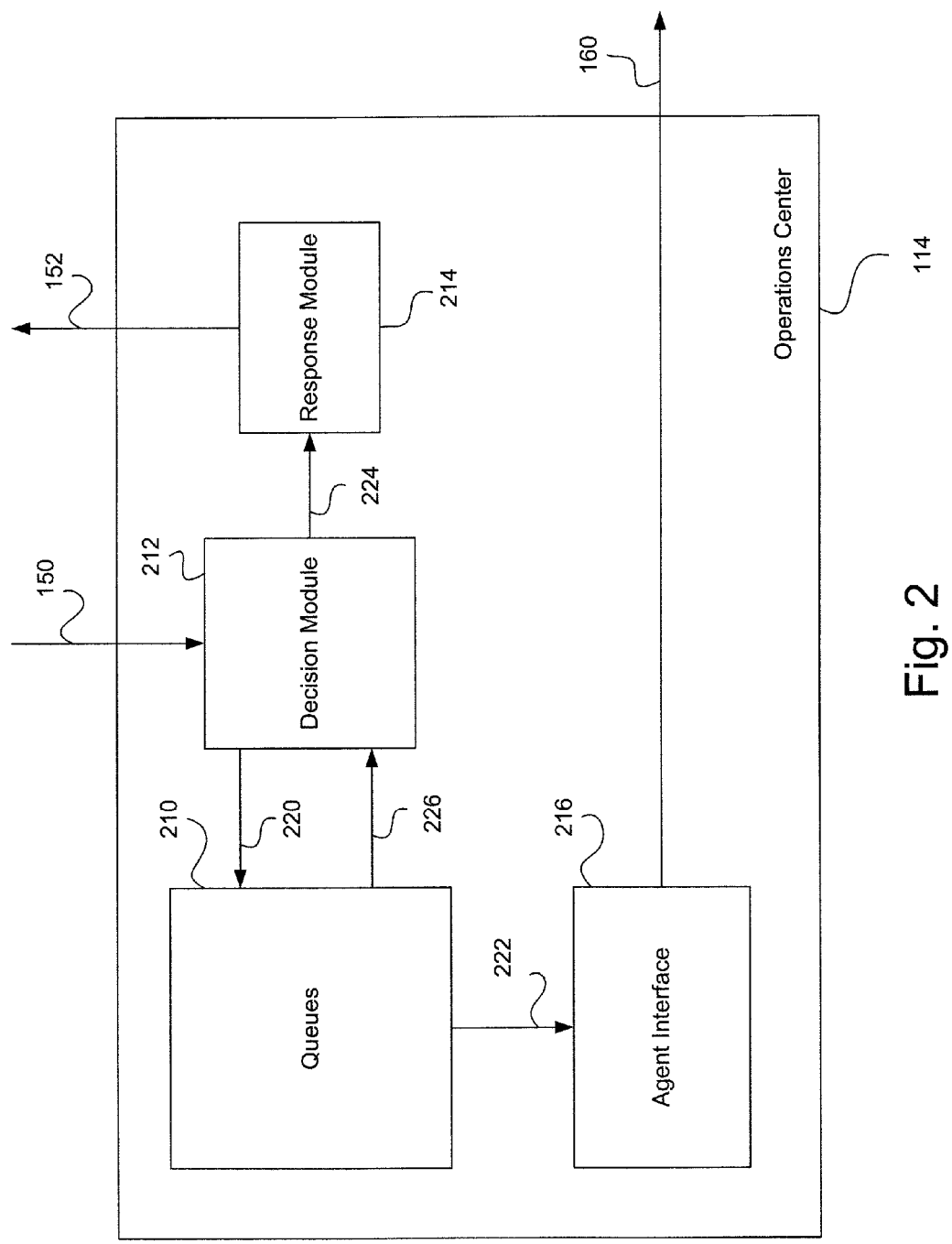
FIG. 2 is a block diagram of one embodiment of the operations center of FIG. 1 according to the invention.

FIG. 2 is a block diagram of one embodiment of the operations center 114 of FIG. 1 according to the invention. Operations center 114 includes, but is not limited to, queues 210, a decision module 212, a response module 214, and an agent interface 216.

Decision module 212 receives communications via path 150. Decision module 212 analyzes each communication and determines whether a partial response, such as an acknowledgement, is required. An acknowledgement is a brief response that indicates to the sender that the communication was received. Another type of partial response may include routine information such as an organization's hours of operation or a request for further information from the sender. If a partial response is not required, decision module 212 forwards the communication via path 220 to queues 210. Operations center 114 may include numerous queues 210 where each queue is assigned to store certain types of communications.

Agents 140-148 select communications to process via path 222, agent interface 216, and path 160. Agents 140-148 process the communications and send any required full responses to customers through contact center 112. The responses may be in the form of an automatic, or canned, reply to a routine request, or in the form of a more individualized, content-rich reply composed by an agent.

When decision module 212 determines that a partial response is required, decision module 212 forwards information identifying the sender and type of request via path 224 to response module 214. Decision module 212 then forwards the communication to queues 210 for processing by agents 140-148.

In the preferred embodiment of the present invention, decision module 212 determines whether a communication requires a partial response according to an estimate of the time required for a full response. If the time estimate for a full response to the communication is lower than a predetermined threshold, then decision module 212 determines that a partial response is not required. Thus, a customer or other sender does not receive multiple communications when a single communication will address their needs. In this way, a user of system 100 is able to provide good service to its customers and other senders without unnecessary and perhaps annoying communications. In another embodiment, decision module 212 may also determine whether a communication requires a partial response based on the subject matter of the communication.

Decision module 212 estimates the time required for a full response based on the content of the communication and how such communications are typically processed. For example, if a communication is typically processed by sending an automatic reply, then processing that communication will take less time than a communication requiring an agent-composed response. Various types of communications that require agent-composed responses may differ in the amount of time required for processing. The amount of time required may depend on the difficulty of the issue needing to be resolved and how often that issue appears in communications. Issues that appear rarely may take more time to process than routine issues.

The amount of time required to process a communication may also depend on the number of communications in queues 210 waiting to be processed. If queues 210 contain a large number of communications, any newly received communications may remain in queues 210 a significant amount of time before being processed. Each queue in queues 210 may contain a particular type of communication. If one queue contains a large number of communications, a communication sent to that queue may remain in the queue longer than another communication may remain in another queue containing fewer communications.

The threshold for determining whether a partial response is required is predetermined by a user of system 100. The value of the threshold may be adjusted at any time to meet the needs of the system user. The system user may determine that the number of partial responses being sent by response module 214 is too high or too low. The value of the threshold may then be adjusted to decrease or increase the number of partial responses.

Response module 214 may send an acknowledgement to the sender indicating that the communication was received. The acknowledgement may include the type of communication received, which may aid the sender in identifying which communication is being acknowledged in the case of multiple communications by one sender. The acknowledgement may also include an estimate of the time required for a full response to the communication, as determined by decision module 212.

Decision module 212 may be implemented as a rule-based system that analyzes the communications and applies rules established by the system user to estimate the time required for a full response. In another embodiment, decision module 212 uses keywords to analyze the communication and estimate the time required for a full response. In another embodiment, decision module 212 utilizes an agent who analyzes each incoming communication and makes a manual decision when a partial response is required based on rules established by the system user.

In the preferred embodiment, decision module 212 is a learning system that analyzes the language of the communication. The preferred embodiment of decision module 212 also learns from feedback which communications require a partial response. Decision module 212 may monitor the actual time elapsed for a full response to be sent and learn what type of communications require a response time less than the threshold value. Such a learning system is described in U.S. Provisional Patent Application No. 60/176,411, filed Jan. 13, 2000, entitled "System And Method For Effective And Efficient Electronic Communication Management," which is hereby incorporated by reference.

Sometimes a communication may remain in queues 210 longer than the time estimate for a full response determined by decision module 212. Decision module 212 may monitor queues 210 via path 226 to identify communications whose time estimate has expired. Decision module 212 may then determine another time estimate for a full response to the communication and forward this estimate to response module 214. Response module 214 may then send another partial response to the sender indicating that the communication is still being processed and the new time estimate for a full response. Response module 214 may send as many partial responses as needed before a full response is sent. The number and frequency of partial responses may be determined by the system user.

Figure 3:
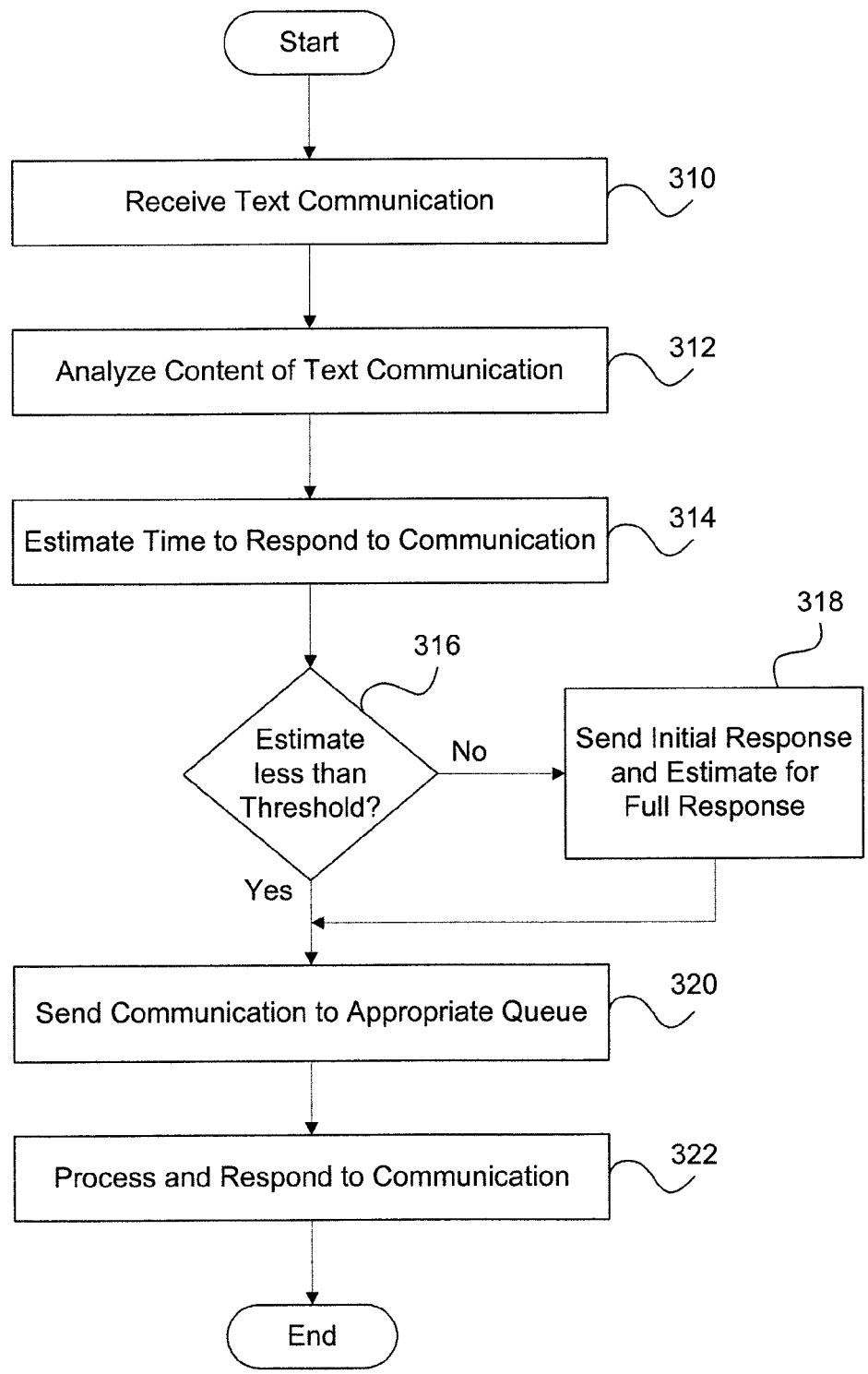
FIG. 3 is a flowchart of method steps for optimizing timing of responses to customer communications according to one embodiment of the invention.

FIG. 3 is a flowchart of method steps for optimizing timing of responses to communications according to one embodiment of the invention. First, in step 310, contact center 112 receives a text communication from a sender. In step 312, decision module 212 analyzes the content of the text communication. Then, in step 314, decision module 212 estimates the amount of time required to respond fully to the communication. The time estimate may be based on the subject matter of the communication, queue depth, or whether an automatic reply is sufficient.

Next, in step 316, decision module 212 compares the time estimate with a threshold value. If the estimate is less than the threshold, then, in step 320, decision module 212 sends the communication to the appropriate queue in queues 210. If the estimate is not less than the threshold, then, in step 318, response module 214 sends a partial response to the sender, for example an acknowledgement that the communication was received. The partial response preferably also includes the time estimate for a full response to the communication.

The FIG. 3 method then continues with step 320, where decision module 212 sends the communication to the appropriate queue in queues 210. Then, in step 322, an agent 140 selects the communication from the queue in turn to process and respond to the communication. In this manner, the method of the present invention optimizes timing of responses to communications.

Figure 4:
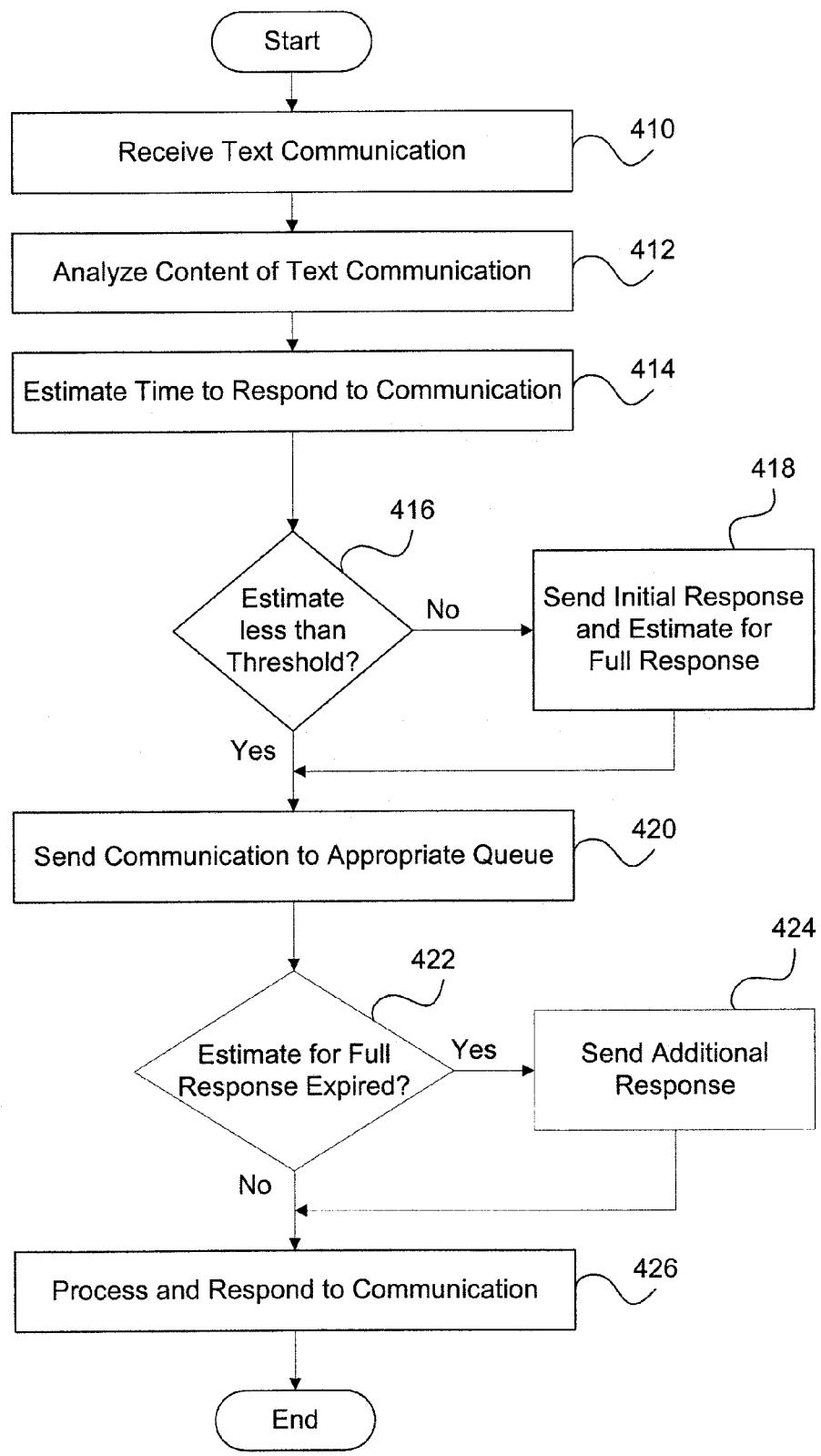
FIG. 4 is a flowchart of method steps for optimizing timing of responses to customer communications according to another embodiment of the invention.

FIG. 4 is a flowchart of method steps for optimizing timing of responses to customer communication according to another embodiment of the present invention. First, in step 410, contact center 112 receives a text communication from a sender. In step 412, decision module 212 analyzes the content of the text communication. Then, in step 414, decision module 212 estimates the amount of time required to respond fully to the communication. The time estimate may be based on the subject matter of the communication, queue depth, or whether an automatic reply is sufficient.

Next, in step 416, decision module 212 compares the time estimate with a threshold value. If the estimate is less than the threshold, then, in step 420, decision module 212 sends the communication to the appropriate queue in queues 210. If the estimate is not less than the threshold, then, in step 418, response module 214 sends a partial response to the sender, for example an acknowledgement that the communication was received. The partial response preferably also includes the time estimate for a full response to the communication.

The FIG. 4 method then continues with step 420, where decision module 212 sends the communication to an appropriate queue in queues 210. In step 422, decision module 212 determines whether the time estimate for a full response to the communication has expired. If the time estimate has expired, then in step 424 decision module 212 determines another time estimate and response module 214 sends an additional partial response to the sender. If the time estimate for a full response has not expired, then in step 426, an agent 140 selects the communication in turn to process and respond to the communication.

The invention has been explained above with reference to a preferred embodiment. Other embodiments will be apparent to those skilled in the art in light of this disclosure. For example, the present invention may readily be implemented using configurations other than those described in the preferred embodiment above. Additionally, the present invention may effectively be used in conjunction with systems other than the one described above as the preferred embodiment. Therefore, these and other variations upon the preferred embodiments are intended to be covered by the present invention, which is limited only by the appended claims.

What is claimed is:

1. A system for optimizing timing of responses to communications, comprising:
   an electronic communication system including:
   a contact center configured to receive a communication from a sender; and
   an operations center for processing the communication received by the contact center and including:
   a decision module configured to analyze the communication and determine whether a partial response to the communication is required, before a full response is sent to the communication, based on the communication's content and how such communications are typically processed,
   wherein the decision module determines whether the communication requires the partial response according to an estimated time required for the full response to the communication and based on the communication's content and how such communications are typically processed; and
   a response module configured to send the partial response to the sender, if required,
   wherein the decision module determines a new estimated time required for the full response to the communication after the response module sends the partial response, and the response module sends a new partial response, before the full response is sent to the communication, indicating that the communication is still being processed, after the new estimated time required has been exceeded and based on the communication's content and how such communications are typically processed.

2. The system of claim 1, wherein, when the estimated time required for the full response to the communication is lower than a threshold, then the decision module determines that the partial response is not required.

3. The system of claim 2, wherein the decision module monitors an actual time elapsed for a full response to be sent to learn what type of communications require a response time less than the threshold.

4. The system of claim 2, wherein the threshold is adjusted to decrease or increase the number of partial responses.

5. The system of claim 1, wherein the decision module is a rule-based system that analyzes the communication and applies one or more rules to determine the estimated time required for the full response to the communication.

6. The system of claim 1, wherein the decision module learns from feedback which communication requires the partial response.

7. The system of claim 1, wherein the decision module monitors queues to identify the communication whose estimated time required for the full response has been exceed.

8. A method for optimizing timing of responses to communications, comprising:
   receiving a communication from a sender at a contact center of an electronic communication system;

determining whether the communication requires a partial response, before a full response is sent to the communication, in a decision module of an operations center of an electronic communication system, based on the communication's content and how such communications are typically processed, wherein the decision module analyzes the communication and determines whether the communication requires the partial response according to an estimated time required for the full response to the communication and based on the communication's content and how such communications are typically processed; and sending the partial response to the sender, if required, from a response module of the operations center;

wherein the decision module determines a new estimated time required for the full response to the communication after the response module sends the partial response, and the response module sends a new partial response, before the full response is sent to the communication, indicating that the communication is still being processed, after the new estimated time required has been exceeded and based on the communication's content and how such communications are typically processed.

9. The method of claim 8, wherein, when the estimated time required for the full response to the communication is lower than a threshold, then the decision module determines that the partial response is not required.

10. The method of claim 9, wherein the decision module monitors an actual time elapsed for a full response to be sent to learn what type of communications require a response time less than the threshold.

11. The method of claim 9, wherein the threshold is adjusted to decrease or increase the number of partial responses.

12. The method of claim 8, wherein the decision module is a rule-based system that analyzes the communication and applies one or more rules to determine the estimated time required for the full response to the communication.

13. The method of claim 8, wherein the decision module learns from feedback which communication requires the partial response.

14. The method of claim 8, wherein the decision module monitors queues to identify the communication whose estimated time required for the full response has been exceed.

* * * * *